United States Patent
Neal et al.

(10) Patent No.: US 12,458,536 B2
(45) Date of Patent: Nov. 4, 2025

(54) METHODS FOR CUSTOMIZING INTRAOCULAR LENS USING AN OPTICAL ABERROMETER

(71) Applicant: Wavefront Dynamics, Inc., Albuquerque, NM (US)

(72) Inventors: Daniel R. Neal, Albuquerque, NM (US); R. James Copland, Albuquerque, NM (US); Jeff Kolberg, Laguna Beach, CA (US)

(73) Assignee: WaveFront Dynamics, Inc., Albuquerque, NM (US)

( * ) Notice: Subject to any disclaimer, the term of this patent is extended or adjusted under 35 U.S.C. 154(b) by 571 days.

(21) Appl. No.: 17/830,281

(22) Filed: Jun. 1, 2022

(65) Prior Publication Data
US 2022/0370243 A1 Nov. 24, 2022

Related U.S. Application Data

(63) Continuation-in-part of application No. 17/325,168, filed on May 19, 2021, now Pat. No. 12,245,972.

(51) Int. Cl.
*A61F 9/008* (2006.01)

(52) U.S. Cl.
CPC .......... *A61F 9/008* (2013.01); *A61F 9/00804* (2013.01); *A61F 2009/0087* (2013.01);
(Continued)

(58) Field of Classification Search
CPC .......... A61F 9/00804; A61F 2009/0087; A61F 2009/00872; A61F 2009/10088;
(Continued)

(56) References Cited

U.S. PATENT DOCUMENTS

| | | |
|---|---|---|
| 3,536,383 A | 10/1970 | Cornsweet et al. |
| 4,287,410 A | 9/1981 | Crane |

(Continued)

FOREIGN PATENT DOCUMENTS

| | | |
|---|---|---|
| WO | WO2004084719 | 7/2004 |
| WO | WO2004072709 | 8/2004 |
| WO | WO2012130818 A1 | 4/2012 |

OTHER PUBLICATIONS

Xin Wei, Larry Thibos "Design and validation of a scanning Shack Hartmann aberrometer for measurements over a wide field of view," Optics Express, Jan. 18, 2010, vol. 18, No. 2, , p. 1134-1143.

(Continued)

*Primary Examiner* — Scott M. Getzow
(74) *Attorney, Agent, or Firm* — Quinn IP Law

(57) ABSTRACT

Method steps for correcting vision in an eye that uses a customized phakic IOL composing: (1) measuring one or more wavefront aberrations of the eye: (2) designing a wavefront-customized correction profile for an Intraocular Lens (IOL); (3) creating a customized IOL with the customized correction profile; and (4) implanting the customized IOL in the eye. Alternatively, an uncorrected IOL is first implanted and aligned in the eye, followed by in-situ scanning a femtosecond laser spot across the implanted IOL to locally change the Index of Refraction of the IOL material and create an in-situ customized IOL.

17 Claims, 14 Drawing Sheets

(52) U.S. Cl.
CPC ............... *A61F 2009/0088* (2013.01); *A61F 2009/00897* (2013.01); *A61F 2240/002* (2013.01)

(58) Field of Classification Search
CPC ..... A61B 3/0025; A61B 3/0041; A61B 3/101; A61B 3/1015; A61B 3/102; A61B 3/103; A61B 3/107; A61B 3/158
See application file for complete search history.

(56) References Cited

U.S. PATENT DOCUMENTS

| | | |
|---|---|---|
| 4,373,787 A | 2/1983 | Crane |
| 4,834,528 A | 5/1989 | Howland |
| 4,836,670 A | 6/1989 | Hutchinson |
| 5,430,505 A | 7/1995 | Katz |
| 5,430,509 A | 7/1995 | Kobayashi |
| 5,777,719 A | 7/1998 | Williams |
| 5,949,521 A | 9/1999 | Williams |
| 6,086,204 A | 7/2000 | Magnante |
| 6,095,651 A | 8/2000 | Williams et al. |
| 6,499,843 B1 | 12/2002 | Cox |
| 6,511,180 B2 | 1/2003 | Guirao |
| 6,550,917 B1 | 4/2003 | Neal |
| 6,554,425 B1 | 4/2003 | Roffman |
| 6,634,750 B2 | 10/2003 | Neal |
| 6,830,712 B1 | 12/2004 | Roffman |
| 6,848,790 B1 | 2/2005 | Dick |
| 7,044,944 B2 | 5/2006 | Campin |
| 7,572,008 B2 | 8/2009 | Elvesjo |
| 7,699,467 B2 | 4/2010 | Dick |
| 7,963,652 B2 | 6/2011 | Vertegaal |
| 8,360,578 B2 | 1/2013 | Nummela |
| 8,678,591 B2 | 3/2014 | Zhou |
| 9,167,965 B2 | 10/2015 | Jaeken |
| 9,301,675 B2 | 4/2016 | Kiderman |
| 9,649,029 B2 | 5/2017 | Blixt |
| 9,918,873 B2 | 3/2018 | Woodley |
| 9,949,636 B2 | 4/2018 | Kersting |
| 9,999,348 B2 | 6/2018 | Gao |
| 10,080,493 B2 | 9/2018 | Reimer |
| 10,166,731 B2 | 1/2019 | Grubbs et al. |
| 10,188,287 B2 | 1/2019 | Copland |
| 10,251,784 B2 | 4/2019 | Woodley |
| 10,278,576 B2 | 5/2019 | Hwang |
| 10,420,466 B2 | 9/2019 | Cornsweet |
| 10,463,248 B2 | 11/2019 | Cornsweet |
| 10,485,655 B2 | 11/2019 | Pinto |
| 10,579,141 B2 | 3/2020 | Aleem |
| 10,606,072 B2 | 3/2020 | Aleem |
| 10,694,938 B2 | 6/2020 | Janunts |
| 10,718,942 B2 | 7/2020 | Egea |
| 10,813,550 B2 | 10/2020 | Copland |
| 2004/0021826 A1 | 2/2004 | Sarver |
| 2011/0273669 A1 | 11/2011 | Arbitol |
| 2015/0031993 A1* | 1/2015 | Buckland ............... A61B 3/102 600/425 |
| 2016/0339657 A1* | 11/2016 | Grubbs ................ B29D 11/023 |
| 2018/0003981 A1 | 1/2018 | Urey |
| 2018/0129041 A1 | 5/2018 | Aleem |
| 2018/0129279 A1 | 5/2018 | Melman |
| 2018/0207031 A1 | 7/2018 | Woodley |
| 2018/0243082 A1* | 8/2018 | Zheleznyak ............ G02C 7/04 |
| 2018/0249906 A1 | 9/2018 | Gramatikov |
| 2018/0344157 A1 | 12/2018 | Ng |
| 2019/0231590 A1 | 8/2019 | Woodley |
| 2020/0154996 A1 | 5/2020 | Blixt |
| 2022/0047424 A1* | 2/2022 | Dewey ................ A61F 9/00834 |

OTHER PUBLICATIONS

Blanton, US "Meta-analysis of six excimer laser platforms for safety and efficacy in myopic laser-assisted in situ keratomileusis," Ophthalmic Review vol. 8, Issue 1 Spring 2015.

Moussa "Visual aberrometric photic patient satisfaction LASIK w high resolution aberrometer," Opth-10-2489, (2000).

L. Zheleznyak, "First demonstration of human visual performance through refractive-index modified ophthalmic devices written in hydrogels," IOVS vol. 58(8) 1274-1274, (2000).

G. Gandara-Montano, "Optical bench testing of gradient-index Fresnel lenses written with femtosecond laser induced refractive index change," IOVS vol. 58(8), 1275-1275], (2000).

E. Manche, "Wavefront-optimized versus wavefront-guided LASIK: One-year results of a contralateral eye study," ASCRS 26 2018.

B. Alqattan, A.K. Yetisen, H Butt, "Direct Laser Writing Of Nanophotonic Structures on Contact Lenses", ACS Nano 2018, 12, 5030-5040.

X. He, et. al., Relative position of the central hole after EVO-ICL implantation for moderate to high myopia; BMC Ophthalmology (2020) 20:305.

* cited by examiner

Regular Imaging System

Dark-Field Imaging System

Multi-Zone Intra Ocular Lens (MZ-IOL), 30

SEC A-A

METHODS FOR CUSTOMIZING INTRAOCULAR LENS USING AN OPTICAL ABERROMETER

CROSS-REFERENCES TO RELATED APPLICATIONS

This application is related to co-pending application "Optical Aberrometer Systems for Customizing Intraocular Lens", which was filed on the same day by Daniel R. Neal, R. James Copland, and Jeff Kolberg, and which is incorporated herein by reference. This application is also a Continuation-In-Part (CIP) of U.S. Ser. No. 17/325,168, "System and Method for Customizing an Intraocular Lens Using a Wavefront Abberometer" by Daniel R. Neal, R. James Copland, Alan Blair, and Xifeng Xiao, filed May 5, 2021, which is also incorporated herein by reference.

FIELD OF THE INVENTION

The general field of the invention includes ophthalmology and optometry, and the use of specialized optical instruments (aberrometers) that use wavefront sensors for measuring on-axis (central vision) aberrations of an eye's optical properties. Customized contact lenses can be made that correct for these measured aberrations.

BACKGROUND OF THE INVENTION

Phakic intra-ocular lenses (IOLs) are currently made by Staar Surgical AMO, and Ophtec. The word "Phakic" refers to a situation where the patient's natural crystalline lens is left untouched during a surgical operation (as opposed to cataract surgery, which removes the clouded natural lens) IOLs are currently made by Staar Surgical, AMO and Ophtec. The Staar phakic IOL is named "Visian ICL" (Implantable Contact Lens) and it is implanted between the iris and the crystalline lens. Visian ICL is made of soft collamer material that is manufactured by Staar. The version most commonly used only corrects spherical errors (sphere), but is also available in a toric version as well for correcting astigmatism [U.S. Pat. No. 10,485,655], The AMO phakic IOL is named "Veriseye" and it is implanted in the anterior chamber of the eye, in between the iris and the cornea. Veriseye is made of rigid PMMA plastic. The Ophtec phakic IOL is named "Artiflex" and it also is implanted in anterior chamber of the eye. It is available as sphere only or toric. Phakic IOLs are FDA-approved for refractive correction for people between the ages of 21 and 40 years old and for refractive errors between −6 D and −20 D.

Phakic IOLs have many advantages. Compared to traditional contact lenses, phakic IOLs are permanently implanted so there is no daily routine of putting them in and taking them out. Compared to LASIK or PRK, phakic IOLs can often be implanted in eyes that are not suitable for LASIK or PRK due to conditions such as thin corneas or extreme myopia that is outside the range that LASIK is able to treat. Sometimes a phakic IOL can be placed in an eye that has extreme myopia to correct the majority of the refractive error and then LASIK corrects the residual error.

The disadvantage of phakic IOLs is that generally the level of visual acuity that is achieved is not as good as what is routinely achieved with contact lenses or LASIK According to Dr. Brian Boxer Wachler, writing on the website www.AllAboutVision.com, "In a study of 3-year outcomes of the FDA clinical trial of the Verisyse lens, 84% of patients achieved uncorrected vision of 20/40 or better, which is the legal limit for driving without prescription eyewear in most states. And, 31% achieved uncorrected vision of 20/20 or better. In FDA trials of the posterior chamber Visian ICL, 81% of patients achieved uncorrected visual acuity of 20/40 or better. Forty-one % attained uncorrected vision of 20/20 or better." By comparison, for LASIK, over 90% of patients attain uncorrected vision of 20/20 or better.

Part of the difference is because phakic IOLs are being used with patients that have more severe visual problems than a typical LASIK patient that may be only having a few diopters of refractive error being corrected. Also, part of the modern success of LASIK has been the application of wavefront measurement in planning and in post-surgical evaluations that have resulted in steady improvements in the LASIK treatments. Also, the surgeons can target precise treatment zones for LASIK by use of iris registration eye tracking. By contrast, the application of wavefront measurements to improving phakic IOLs has been less intense. And there remains a difficulty that surgeons do not have good control or ability to predict exactly where a phakic IOL will end up in the eye after a surgery.

The goal of the inventions described in this disclosure is to bring wavefront technology into phakic IOL planning and evaluation steps to improve visual outcomes. Phakic IOLs present various technical differences and difficulties that require novel ideas to enable effective systems and procedures. These include being able to measure the eye and predict the final phakic IOL's position. Horizontal and vertical positioning is one area of difficulty. Also, the precise location of the phakic IOL along the optical axis of the eye is of concern. Another area of difficulty is that phakic IOLs are more frequently being used for patients that have keratoconus (progressive thinning of the cornea). Theoretically, a customized phakic IOL can be machined to correct aberrations from the cornea once those have been measured with a wavefront aberrometer. But the customized shape typically would only achieve 20/20 vision if the phakic IOL were positioned within 0.2 mm of the optical axis and rotated to within 5 degrees of the ideal. Increased displacements from the ideal position result in a reduction in visual acuity that is more pronounced as the displacement increases.

Visian phakic ICLs made by Staar Surgical have a unique feature, which is small, central hole (e.g. U.S. Pat. No. 10,485,655). Early versions of Visian ICL's did not have the hole and sometimes patients would develop cataracts in response to the implant. Initially, the cause was believed to be contact between the crystalline lens and the phakic IOL. However, it was found that a central hole actually prevented cataract formation, probably because it enabled fluid exchange. The hole is small, so it has minimal effect on the visual acuity of the patient. The hole is difficult to see by someone who is looking at the IOL, but it can be detected under slit lamp examination. For adapting wavefront technology to Visian ICL lenses, the hole may serve as a good indicator of phakic IOL position after implantation.

Wavefront aberrometers have been effectively used to measure the ocular aberrations of the human eye. A small spot of light is projected onto the cornea and the scattered light is collected by the lens and cornea and imaged onto a wavefront sensor (Shack-Hartmann, pyramid interferometer, etc.). The sensor measures the wavefront of the light to find optical properties of the eye [U.S. Pat. No. 6,550,917, US RE42,782 D, U.S. Pat. Nos. 7,699,467, 6,848,790, WO 99/27334, WO 00/19885. WO 00/03415, U.S. Pat. Nos. 6,634,750, 5,430,509, 6,086,204, 6,511,180, 6,095,651, 6,086,204, and 5,777,719]. The measurement can be analyzed in terms of standard Zernike polynomials and provides information about the ocular optical system. Wavefront based refraction has been shown to closely match the refraction measured with subjective methods [E. Manche, "Wavefront-optimized versus wavefront-guided LASIK: One-year results of a contralateral eye study." ASCRS 26 2018]. The refraction is derived primarily from the low order aberration terms while higher order terms describe additional aberrations of the eye. These higher-order aberrations can affect vision as well as the base refraction.

Measured wavefront aberrations have been used as a guide for surgical correction of a patient's vision. Laser refractive surgery has developed systems and methods for using the wavefront information to either optimize optical structures [U.S. Pat. No. 7,044,944] or directly guide the surgery [U.S. Pat. Nos. 5,949,521, 6,095,651]. Specialty instruments have been developed that incorporate both wavefront aberrometry and corneal topography in a single instrument, which allows for co-aligned measurement of the total aberrations and anterior cornea along a single (and known) fixation axis. This provides information needed for guiding the surgery, and for planning a laser treatment that incorporates known reflection and beam footprint calibrations [Clinical and patient reported outcomes after wavefront guided LASIK for myopia using a high-definition Hartmann Shack Aberrometer," C. Kraff, R. Maloney, and S. Coleman, ASCRS 23_2018]. The wavefront-guided treatment methodology has been shown to be effective at producing excellent patient outcomes using laser refractive surgery [S. Moussa et al, "Visual, aberrometric, photic phenomena, and patient satisfaction after myopic wavefront-guided LASIK using a high-resolution aberrometer." Clinical Ophthalmology 2016:10 2849-2496; C. Blanton, "Meta-analysis of six excimer laser platforms of safety and efficacy in myopic Laser-Assisted in situ keratomileusis, US Ophthalmic, Review, Vol 8 (1), Spring 2015].

The wavefront-guided approach has also been applied to other treatment modalities [U.S. Pat. Nos. 5,777,719, 6,086,204], including contact lenses [U.S. Pat. Nos. 6,499,843, 6,554,425, 6,830,712, and WO 04072709A], with some success. However, these techniques have not been used in wide clinical practice, partially due to the instability of the contact lens on the eye. This is difficult to overcome because the comfort of the contact lens depends to some extent on the fact that it moves on the eye, spreading the tear film and providing oxygen to the cornea.

Some other technologies exist that provide correction for optical error of the eye and that do not move appreciably. The World Health Organization estimates that 20 million IOLs were implanted worldwide in 2010, and they project 32 million will be implanted annually by 2020. The vast majority of IOLs are simple monofocal designs, but increasingly premium IOLs are being developed that incorporate wavefront adjustments into their design. The IOL may be implanted in the capsular bag after removal of the natural (presumably cataractous) lens, or implanted in the sulcus, just behind the iris U.S. Pat. No. 10,485,655], or even "clipped" to the iris itself.

New techniques can modify the refractive/diffractive characteristics of an IOL or ICL in vivo by changing the index of refraction with a small spot, scanning, pulsed laser beam [L. Zheleznyak, "First demonstration of human visual performance through refractive-index modified ophthalmic devices written in hydrogels," IOVS Vol. 58(8) 1274-1274, G. Gandara-Montano, "Optical bench testing of gradient-index Fresnel lenses written with femtosecond laser induced refractive index change," IOVS Vol 58(8), 1275-1275]. The beam in the eye must be precisely positioned and controlled and that requires accurate measurement to direct and monitor beam delivery. The process of writing a desired optical pattern on an IOL can take tens of seconds. During that time, the IOL may move in the eye even if the eye has been applanated by external means. A method is needed to track the position and tip/tilt of the IOL in the eye in real-time during the procedure.

A number of optical techniques have been developed to measure structures in the eye, including wavefront aberrometry, corneal topography, ultrasound, and optical coherence tomography (OCT). However, these techniques are usually aimed at a more general diagnosis of the eye, and they lack the combination of accuracy, dynamic range and speed to actively control surgical procedures. All references cited herein are incorporated herein by reference in their entirety. Against this background, the following invention was developed.

SUMMARY OF THE INVENTION

The present invention comprises methods for correcting vision in an eye that uses a customized phakic IOL, the method comprising: (1) measuring one or more wavefront aberrations of the eye; (2) designing a wavefront-customized correction profile for an Intraocular Lens (IOL); (3) creating a customized IOL with the customized correction profile; and (4) implanting the customized IOL in the eye. Alternatively, an uncorrected IOL is first implanted and aligned in the eye, followed by in-situ scanning a femtosecond laser spot across the implanted IOL to locally change in-situ the Index of Refraction of the IOL material and create an in-situ customized IOL.

DETAILED DESCRIPTION OF THE INVENTION

Figure 1:
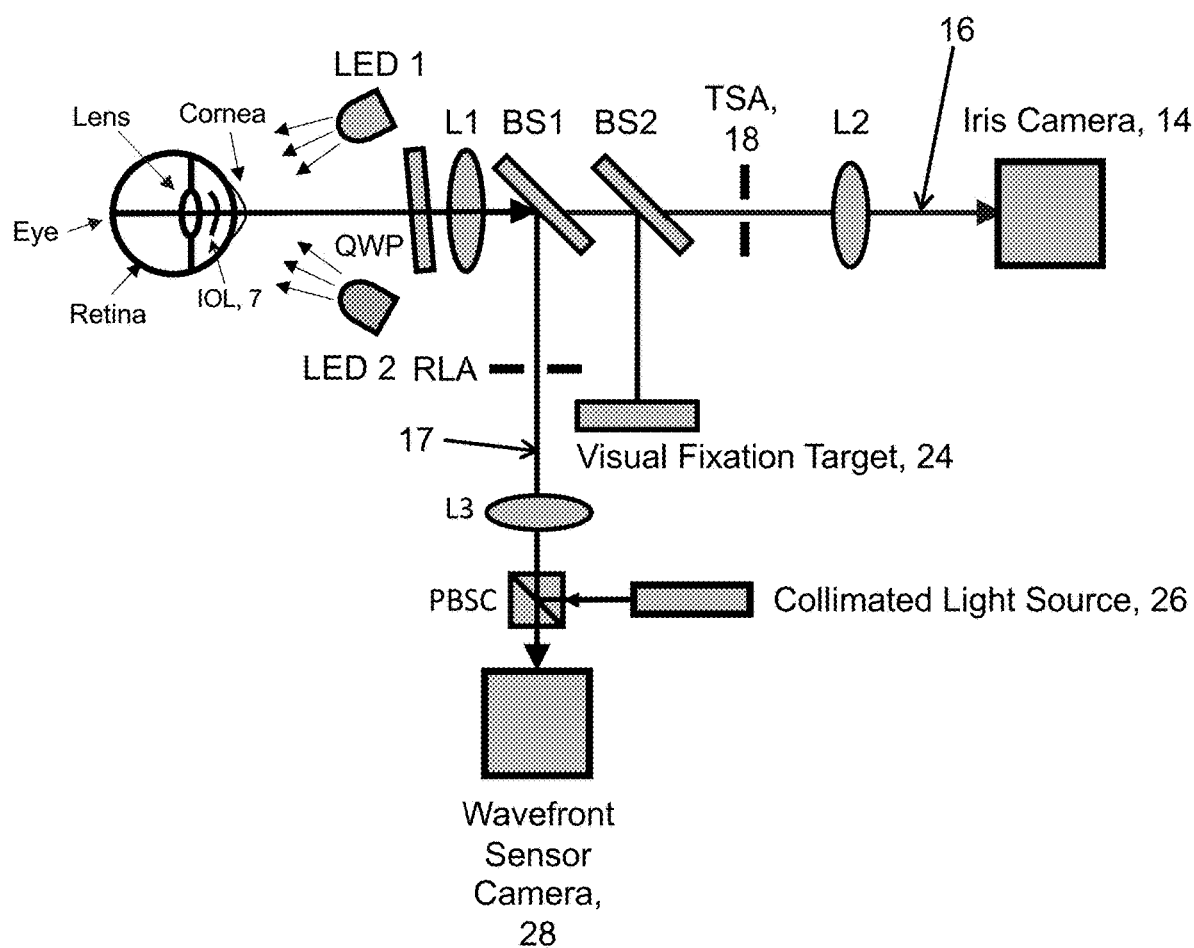
FIG. 1 refers to an optical schematic layout of a first example of an ophthalmic wavefront aberrometer, according to the present invention.

FIG. 1 shows an optical schematic of a first example of an ophthalmic wavefront aberrometer. The aberrometer has 2 optical paths disposed at 90 degrees to each other, including: a regular iris imaging path 16 and a wavefront imaging path 17. The first step of measuring a patient's eye is that the instrument operator aligns the optical instrument to the patient's eye. He/she is aided in this task by the visual image that is generated by Iris camera 14. Once the instrument is aligned, the patient is instructed to look at the internal visual target 24. The target typically simulates a distant scene. For example, a hot air balloon hovering over a distant horizon. While the patient looks at the target 24, the collimated light source 26 emits a narrow beam of light. The light in the beam can be S-polarized and it is barely noticed by the patient because (preferably) it is infrared lightn with a wavelength of 840 nm. Other wavelengths can be used, as needed. The light reflects off the hypoteneuse of the Polarizing Beam Splitting Cube (PBSC). The light travels through the rear lens L2, reflects off beamspitter BS1, travels through front lens L1, then through the quarter wave plate (QWP). The QWP converts the light to circular polarization. Then, the probe light travels into the eye as a narrow beam 16 along the optical axis of the instrument. The cornea and internal crystalline lens focus the beam onto the eye's retina. A small fraction of the light scatters off the retina in all directions. About 0.5% percent of the light goes back toward the cornea and creates an outgoing beam that is same diameter as the iris. For an emmetrope, the outgoing beam is nearly collimated. For a myope, the beam converges slightly as it leaves the cornea. For a hyperope, the beam diverges.

Next the light beam passes through the QWP and is converted to P-polarization. The light travels through L1, reflects off BS1, through L2 and reaches the PBSC. Since the light beam has been converted to P-polarization, it transmits through the PBSC cube, it then reaches the wavefront sensor camera 28. A computer analyzes the images from the wavefront sensor 28 and calculates the patient's refraction and aberrations.

Figure 2:
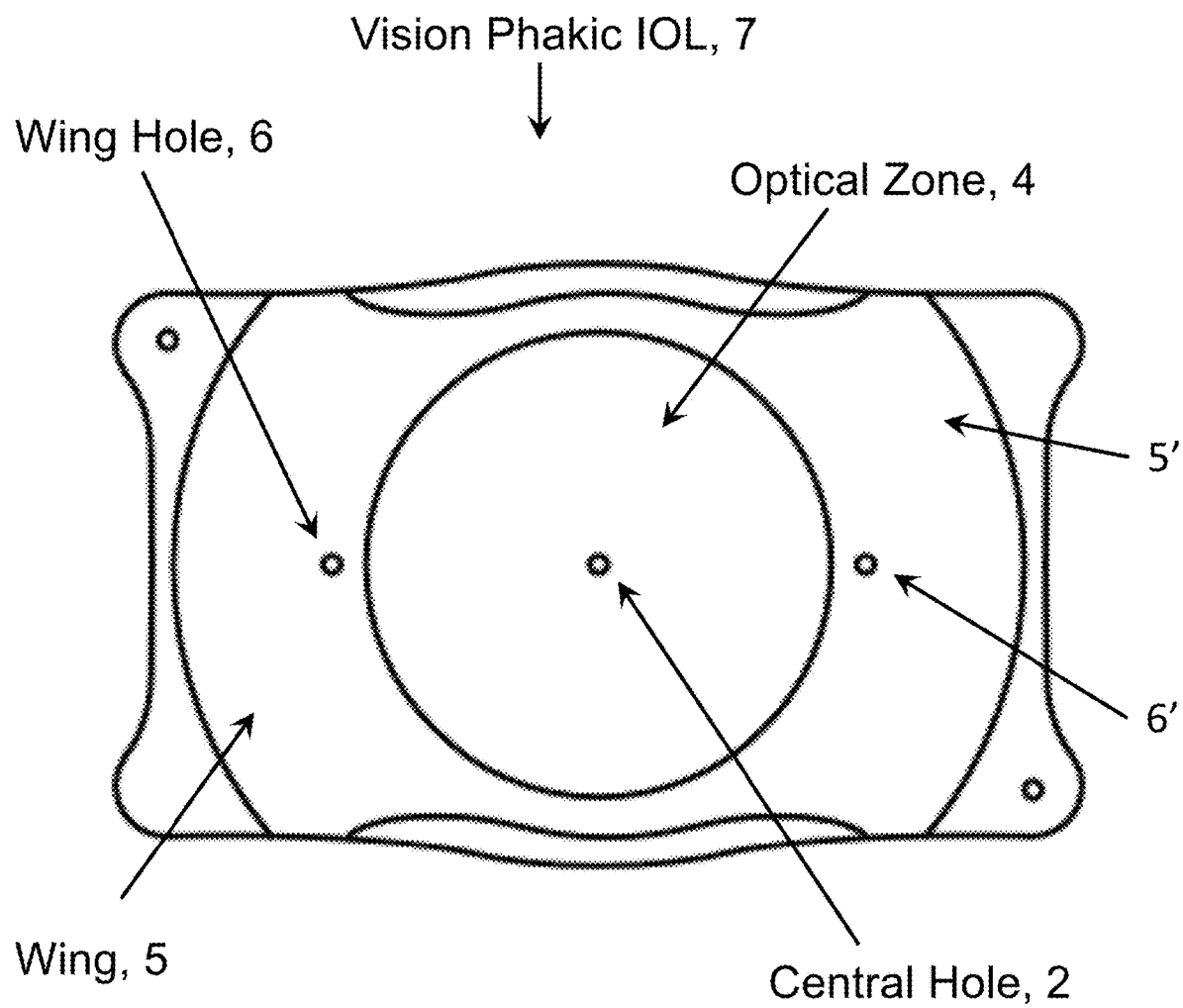
FIG. 2 is a plan view of an example of a typical intraocular lens (IOL).

FIG. 2 shows a plan view of an example of a Visian ICL (phakic IOL 7) that has a central hole 2. The large central circle represents the optical zone 4 of the IOL. The rectangular portions are the wings 5, 5' that fit into the space (posterior chamber) in between the iris and the natural lens of the eye. The central hole 2 allows fluid exchange across the perforated IOL structure that prevents the perforated IOL from inducing cataract formation. Additional thru-holes 6, 6' can be added to further perforate the IOL (up to a point where visual acuity is negatively affected).

Figure 3:
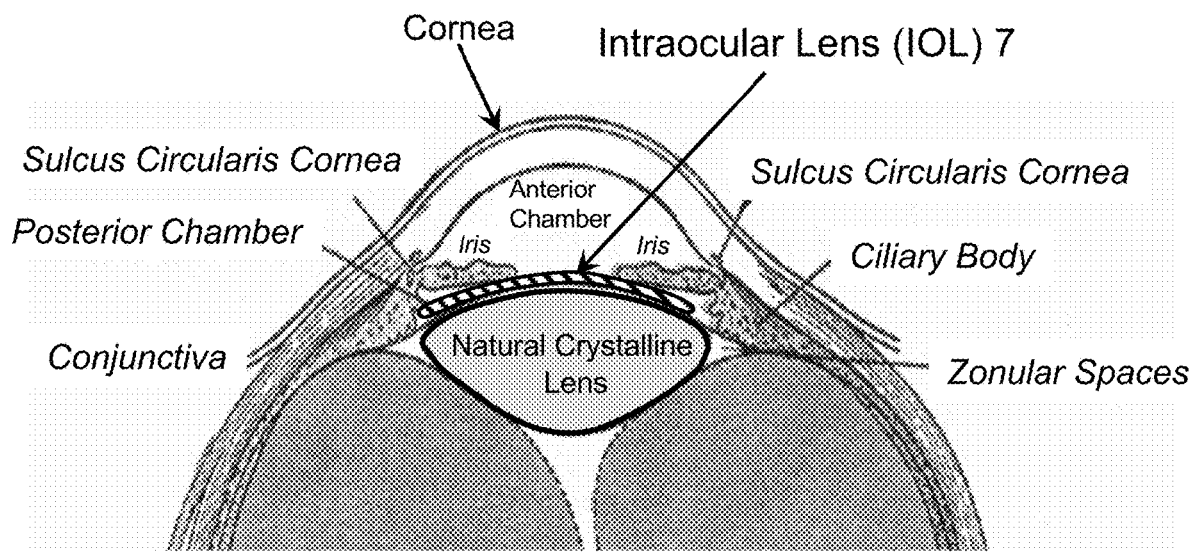
FIG. 3 shows a cross-section view showing the anatomy of a human eye.

FIG. 3 shows a cross-section view of the anatomy of a human eye. The phakic IOL 7 usually sits either just behind the iris in the Posterior Chamber, and is constrained by the ciliary body. It can also sit in-between the cornea and iris (e.g., in an Anterior Chamber).

As described in the background section above, the Visian phakic ICL 7 has a central hole (aperture) 2 that could serve as an indicator of the ICL's position when imaged. Alternatively, a fiducial or other location mark could be placed on the phakic ICL to help identify its angular position in the eye. One embodiment of the instrument could measure the wavefront of the eye and nearly simultaneously find the position of the ICL using its central hole as a landmark. A second embodiment of a useful measurement instrument is a combined aberrometer/topographer/imager. In a third embodiment, this could have additional light sources that come in from the side to provide scattering from the edges of the hole. In a fourth embodiment, this device could also be modified to include a "dark field" imaging path.

Figure 4:
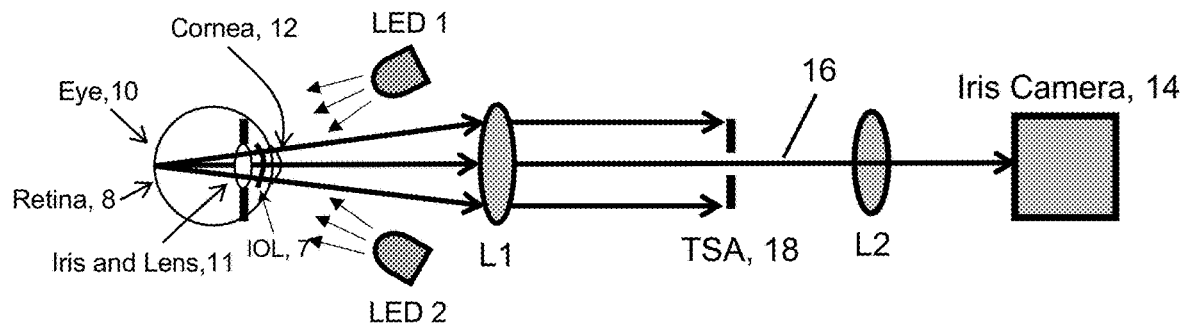
FIG. 4 shows an optical schematic layout of a second example of an ophthalmic wavefront aberrometer, according to the present invention.

FIG. 4 shows an optical schematic layout of a second example of an ophthalmic wavefront aberrometer, according to the present invention. This system is used for making a regular image, which houses an aperture labeled ISA (Telecentric Stop Aperture), 18. It can be simply a hole (aperture) of about 3 mm diameter in a solid disc. Lenses L1 and L2 are separated by a distance that equals the sum of their focal lengths. The TSA stop is located one focal length away from both lenses L1 and L2. This is a conventional telescopic, regular imaging setup, and the image of the eye that forms on the iris camera 14 is a normal one.

Figure 5:
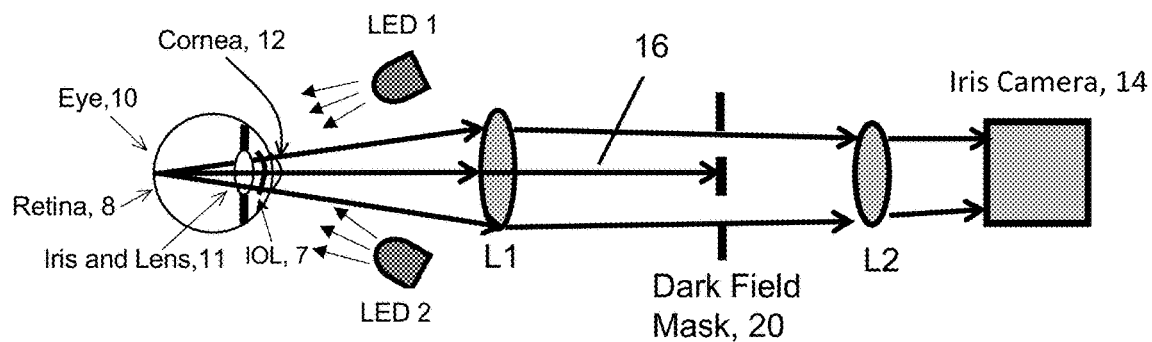
FIG. 5 shows an optical schematic layout of a third example of an ophthalmic wavefront aberrometer with a Dark-Field mask, according to the present invention.

Dark field imaging is a well-known optical technology to those skilled in the art. However, its use for imaging eye structures and features of optical structures implanted in eyes is novel. FIG. 5 shows an optical schematic layout of a third example of an ophthalmic wavefront aberrometer with a Dark-Field mask, according to the present invention. The lower figure FIG. 5, used for making a dark field image, is the same as the embodiment in upper figure FIG. 4, except that the TSA optic 18 has been replaced by a dark field mask (DFM) optic 20. A practical system could switch between the two different configurations by using a solenoid (not shown) to physically exchange the two items with a third optic, such as a Spatial Light Modulator (SLM); a small motor; rotation disk; or other means for repeatedly modulating the light travelling down the optical path.

Figure 6:
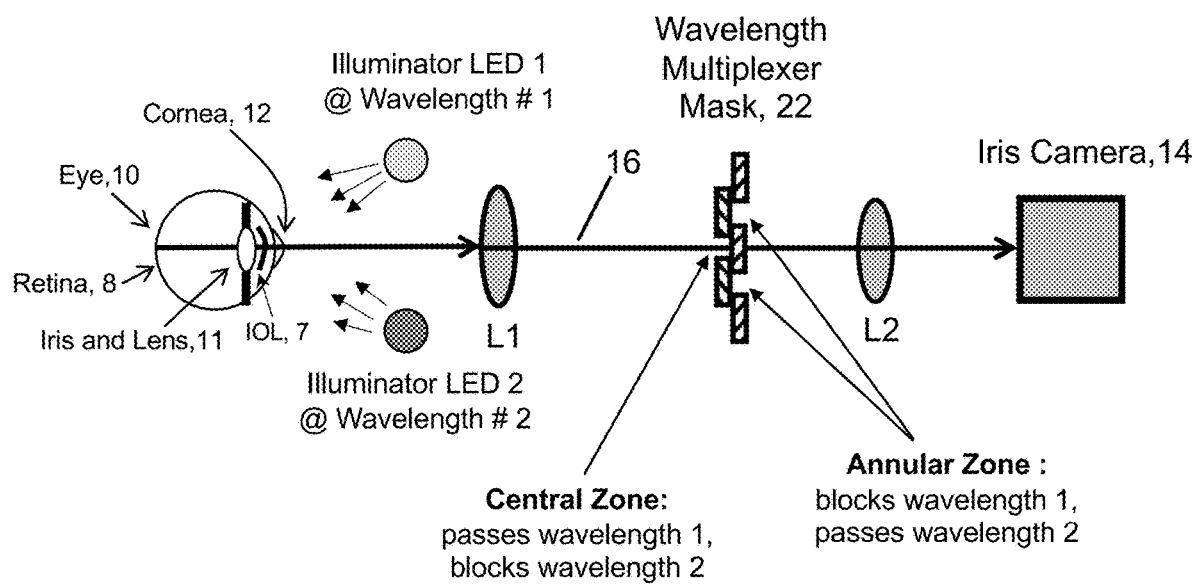
FIG. 6 shows an optical schematic layout of a fourth example of an ophthalmic wavefront aberrometer with a first switchable imager, according to the present invention.

In another embodiment of a measurement system, instead of physically moving a TSA optic 18 and/or DFM optic 20 back and forth along the optical path 16, it is possible to use a stationary Wavelength Multiplexed Mask (WMM) optic 22. FIG. 6 illustrates a first example of such a Switchable Imager system. In the Switchable Image embodiment of the optical system, the wavelength multiplexed mask (WMM) 22 can have a clear central hole (aperture) surrounded by an annular region that blocks one selected wavelength and passes a different wavelength. In this system, one would get a regular image in both optical setups, however one would like to have the edges enhanced. A software subtraction of two sequential images, for example, could be used to make a single dark field image.

In another embodiment, the system of FIG. 6 is modified by using a pair of Individually controlled LED illumination sources (First LED 1 & Second LED 2) emitting the same, or two different, wavelengths in FIG. 6. by switching sources On/Off between LED 1 and LED 2 only one side of the fiducial mark on the IOL would be illuminated. This will have the effect of enhancing the mark's shadows to make the fiducial feature more evident. Also, the two LEDs could be alternatively switched on/off on alternating frames of the iris camera 14 using active software control means.

As an example of a device made according to FIG. 1, the iDesign™ measurement instrument [Johnson & Johnson, 2012] comprises both a wavefront imaging path and a regular iris imaging path. The regular image path comprises a 4 F telecentric configuration using two lenses L1 and L2. Disposed in-between the two lenses L1 and L2 is a 3 mm diameter aperture in the TSA optic that serves as a telecentric stop that allows only rays to reach the iris camera 14 if they enter the instrument traveling nearly parallel to the optical axis 16 of the instrument. However, the rounded edge of the central hole in the phakic IOL will tend to scatter light in many directions not parallel to the instrument's optical axis. The telecentric stop can be replaced with a DFM aperture that has a central obscuration. Such a device is called a "dark field mask" and it is useful to preferentially image the edges of objects, particularly if they have been illuminated by light coming in from the side. An improved instrument that uses iDesign™ technology can be constructed so that a small motor switches the iris imaging path between a conventional TSA telecentric stop and a DFM dark field mask. That would enable a multi-functional, combined instrument: (1) to serve as a corneal topographer, (2) to collect regular iris images, and (3) to find the central hole or other location feature/fiducial marks in a phakic IOL.

Figure 7:
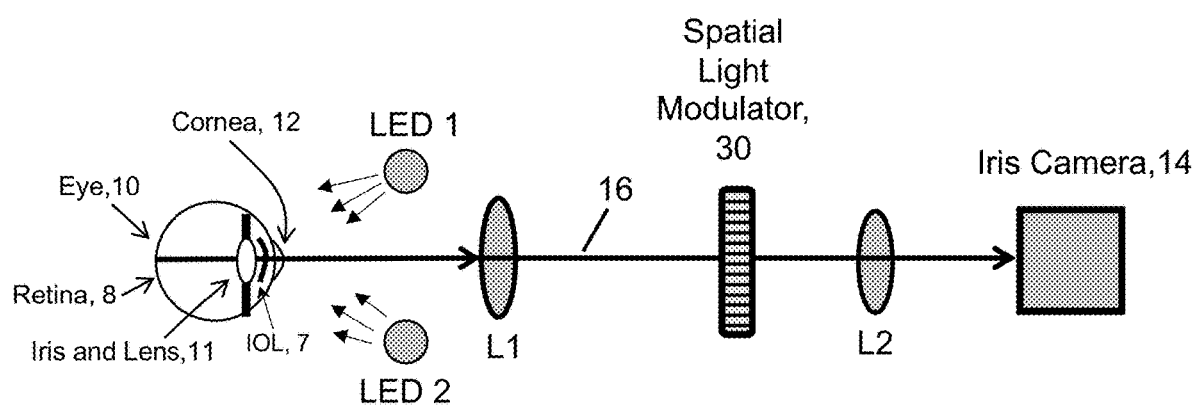
FIG. 7 shows an optical schematic layout of a fifth example of an ophthalmic wavefront aberrometer with a second switchable imager, according to the present invention.
Figure 8:
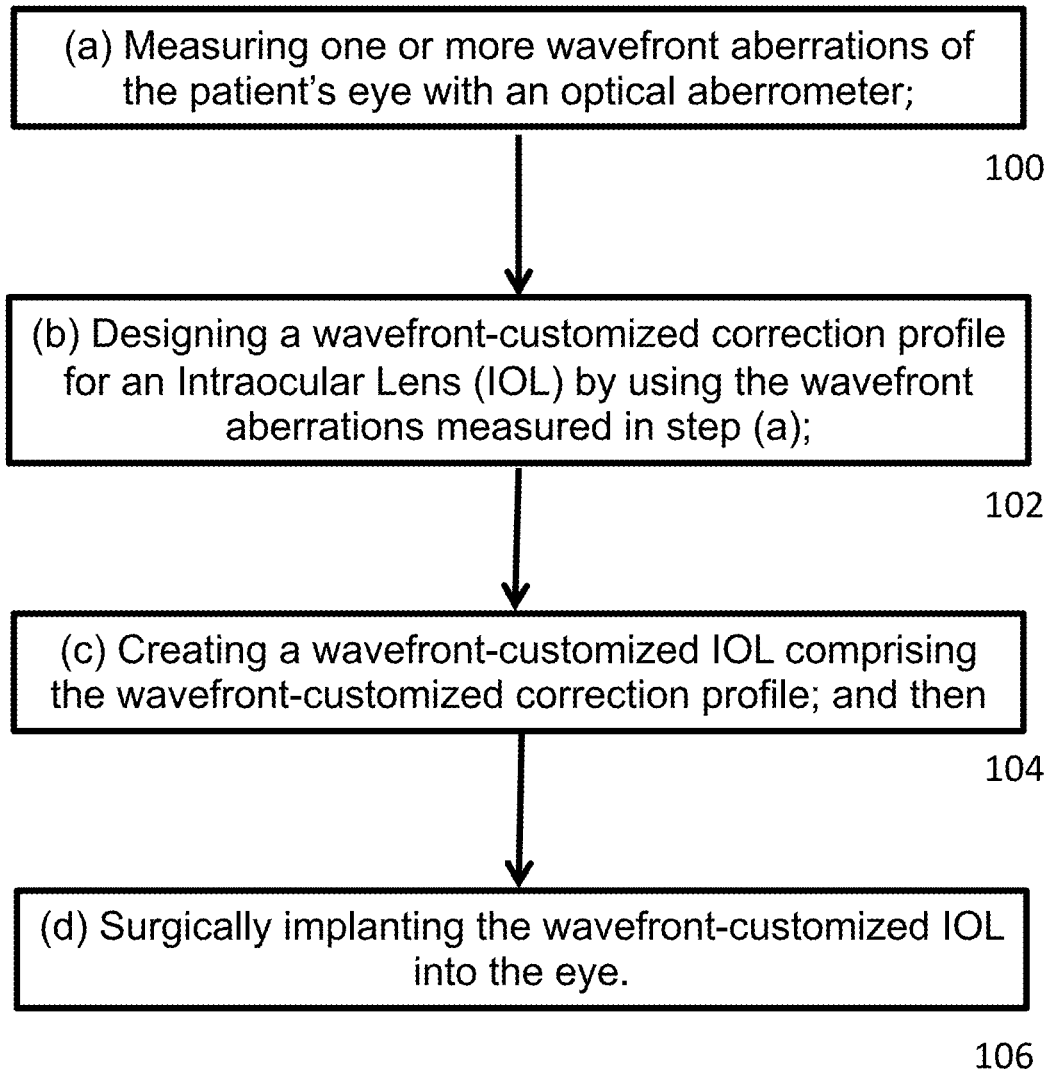
FIG. 8 shows an process flow chart of a first example of a method of improving a patient's vision, according to the present invention.
Figure 9:
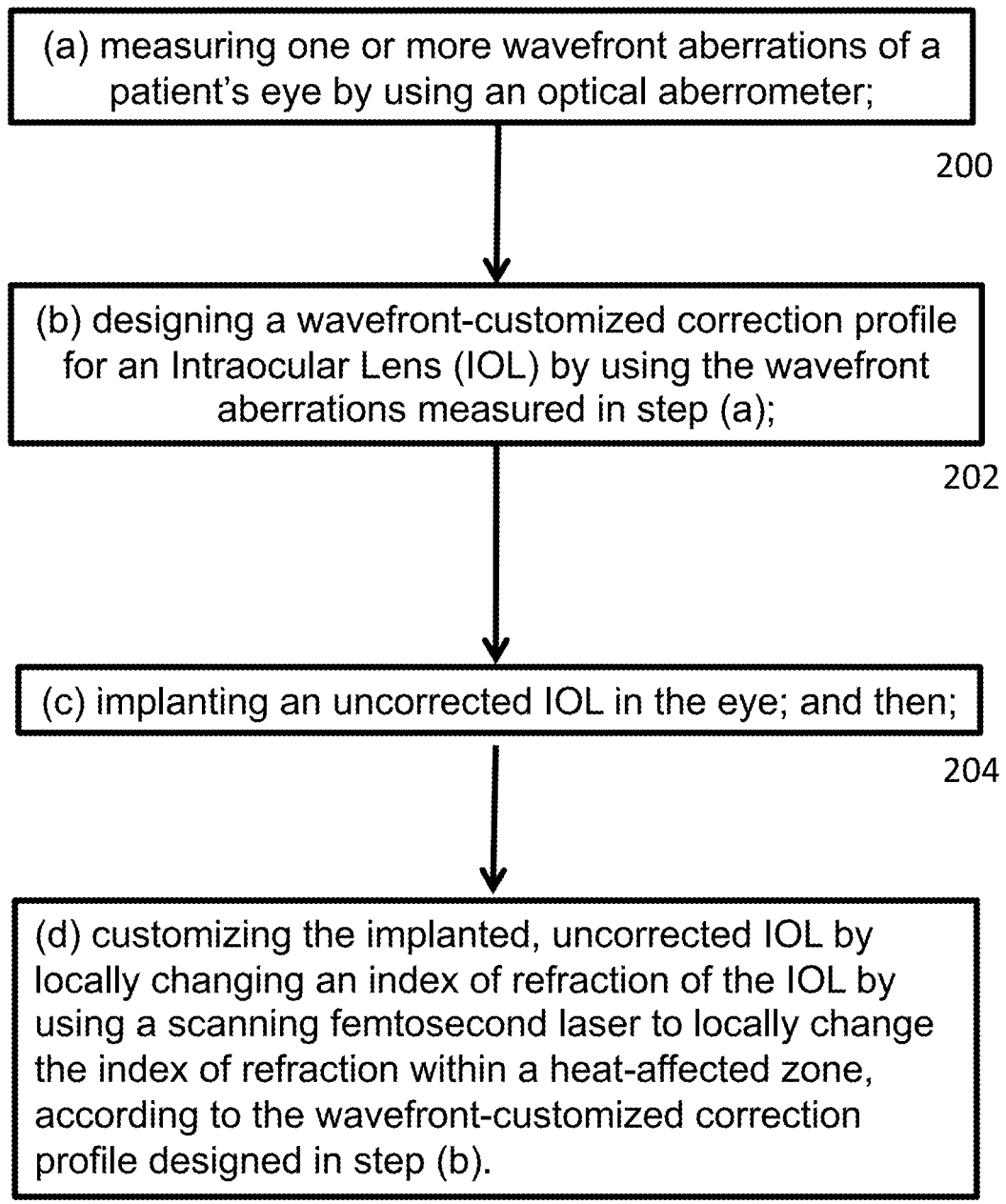
FIG. 9 shows an process flow chart of a second example of a method of improving a patient's vision according to the present invention.
Figure 10:
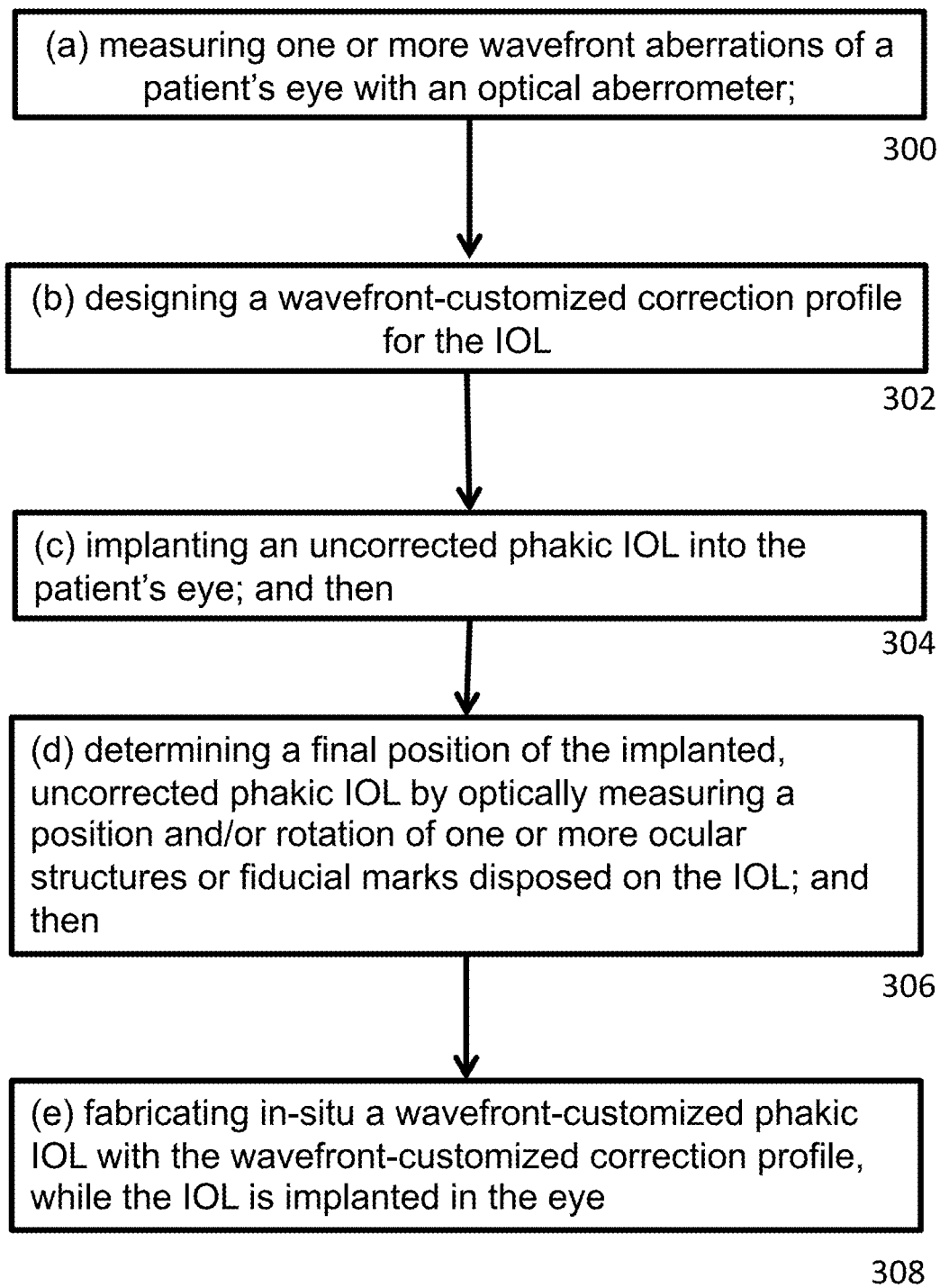
FIG. 10 shows an process flow chart of a third example of a method of improving a patient's vision, according to the present invention.
Figure 11:
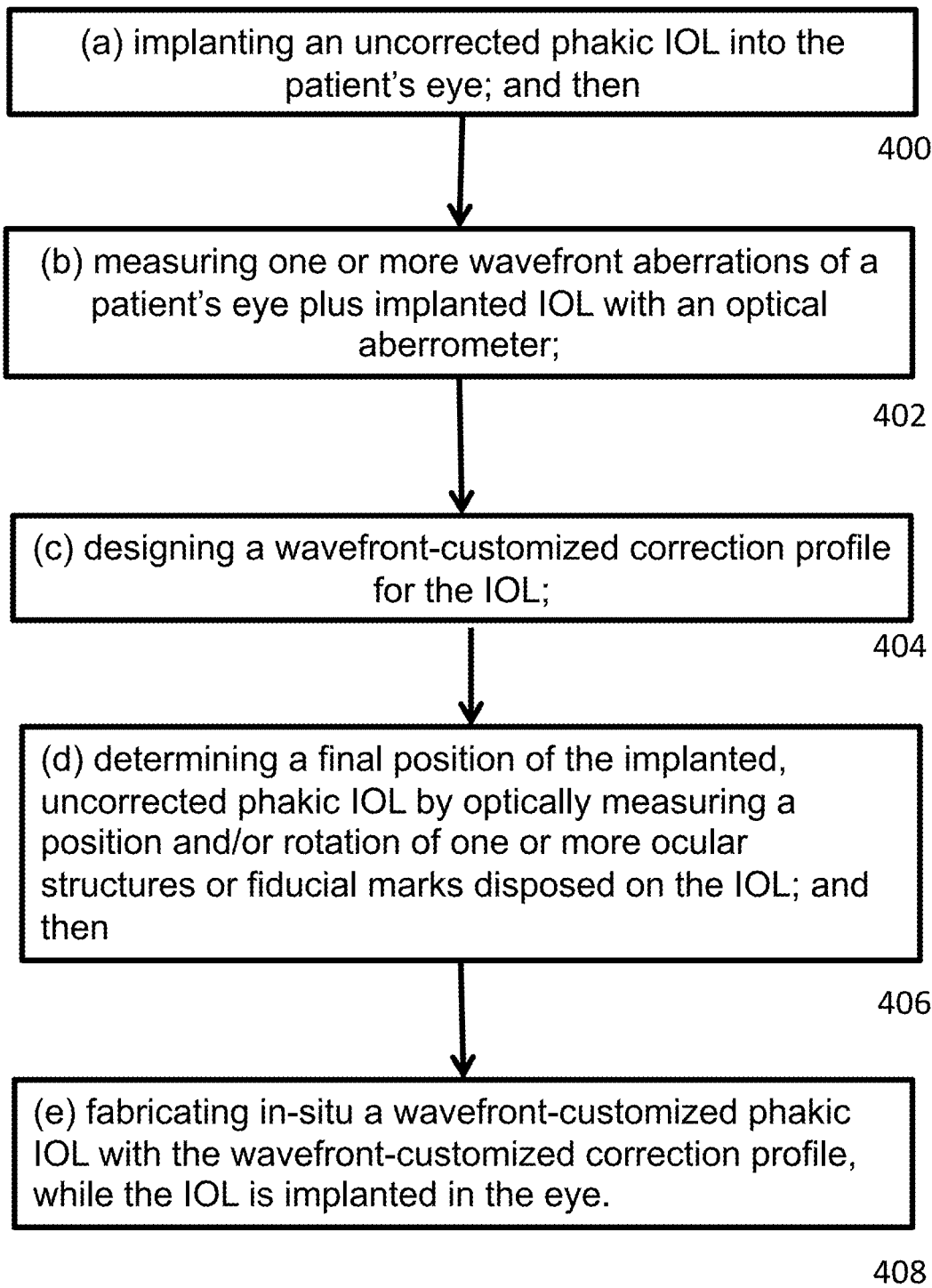
FIG. 11 shows an process flow chart of a fourth example of a method of improving a patient's vision, according to the present invention.

FIG. 7 shows an optical schematic layout of a fifth example of an ophthalmic wavefront aberrometer with a second switchable imager according to the present invention. Here, an alternate method of switching physical stops is to place a spatial light modulator (SLM) 30 at the location of the telecentric stop. For instance, a spatial light modulator can have a grid of N×N different hexagonal (or square or triangular) regions that can be rapidly turned on and off in transmission, enabling a variety of edge detection and optical processing techniques. In one embodiment, the number of hexagons is N=32.

Recently, femtosecond (FS) lasers have been developed that can change the index of refraction of plastic materials by focusing pulsed FS laser energy on a small area and then repeatedly scanning adjacent spots on the plastic to heat and change the optical properties of the small area. Such FS lasers can be used to modify the optical wavefront of phakic IOLs in vivo. Guidance for actively controlling the FS laser spot can be provided by making measurements of the image's wavefront. It is also necessary to know the XYZ location of the plastic IOL material. The central hole in the Visian phakic ICL provides a convenient landmark that can be found, and hence provide the necessary XYZ fiducial location. Additional locations away from the central hole can then be found using Purkinje reflections. A central hole, or other location feature(s), including additional holes, can be added to any other manufacturer s IOL plastic designs to enable this optical enhancement technique.

Convenient methods of locating the XYZ location of the hole (or other location feature) in a phakic IOL can include using split-prism range finders (such as are used in SLR cameras), OCT systems, stereo cameras, bi-cell detectors, or numerous other methodologies.

Another option is to use the femtosecond laser to create fiducial marks on the phakic IOL that can be used for guiding and controlling the motion of a following laser pulse. Such marks can be either simple spots that scatter light coherently, or deeper pits that scatter light incoherently. Or, they can be created to have diffractive structures, such as regularly spaced holes or lines that scatter light preferentially more strongly for certain incident angles and color combinations. Such a diffractively coded system can be created so a color camera effectively "sees" distance as color variations across an image.

In some cases, a doctor will implant a phakic IOL that has tone marks to guide implantation relative to the degree of astigmatism in a patient's eye. Such marks can also be used with a system that creates a customized wavefront pattern on a phakic IOL via a scanning femtosecond laser.

Typically, the manufacturer has a process of machining their phakic IOL that can control the amount of sphere and cylinder errors, and create any desired wavefront pattern. Measurement of a patient's wavefront pattern, that is made before a surgery, can be used to make an ideal wavefront-enhanced, customized phakic IOL. However, with their existing surgical procedures, currently manufactures are unable to take advantage of the potential improvements possible with customized wavefront patterns because of low predictability of where an implanted IOL will end up, both in XY position and in rotation, after implantation.

The outer haptic parts (e.g., wings) of a phakic IOL generally extend over to the ciliary body that suspends the lens in the eye. The size and shape of the interstitial space in the Posterior Chamber between the iris and the ciliary body determine the final position of the phakic IOL. Currently no clinically reliable means have been found to measure and characterize these interstitial spaces before the implantation of the ICL. Techniques that are being considered include: (a) using long wavelength Optical Coherence Tomography (OCT) through the iris, and (b) using long wavelength OCT through the sclera. Other techniques can utilize ultrasound and Magnetic Resonance Imaging (MRI) machines. The same techniques potentially may be used with implanted phakic IOLs to learn more about the mechanism(s) that determine where an IOL finally ends up.

Another area that could use improvement with the current phakic IOLs is that visual acuities reach 20/20 in only about 50% of procedures. This seems to be slightly lower than is achieved with typical monofocal IOL surgeries. Application of customized wavefront techniques would likely result in phakic IOLs achieving better outcomes than typical IOL surgeries.

A variety of embodiments are presented next. A method for correcting vision in a patient's eye can comprise performing the following steps:
(a) measuring one or more wavefront aberrations of the patient's eye with an optical aberrometer;
(b) designing a wavefront-customized correction profile for an Intraocular Lens (IOL) by using the wavefront aberrations measured in step (a);
(c) creating a wavefront-customized IOL comprising the wavefront-customized correction profile; and
(d) surgically implanting the wavefront-customized IOL into the eye.

Step (c) can further comprise creating one or more fiducial marks disposed on the IOL to aide in aligning the IOL in step (d). Step (c) can further comprise precision machining the IOL with the wavefront-customized correction profile by using a numerically-controlled, lathe with a fast Z-axis stage. Step (c) can further comprise locally changing an index of refraction of the IOL by irradiating select regions of the IOL with one or more scanning femtosecond laser pulses.

In another embodiment, a method can comprise correcting a patient's vision with a customized phakic IOL by performing the following steps:
(a) measuring one or more wavefront aberrations of a patient's eye by using an optical aberrometer;

(b) designing a wavefront-customized correction profile for an Intraocular Lens (IOL) by using the wavefront aberrations measured in step (a);
(c) implanting an uncorrected 101 in the eye; and then
(d) customizing the implanted, uncorrected IOL by locally changing an index of refraction of the IOL by using a scanning femtosecond laser to locally heat an area of IOL material sufficient to locally change the index of refraction within a heat-affected zone according to the wavefront-customized correction profile designed in step (b). The method can further comprise determining the size and position of an implanted phakic IOL by dark field imaging a position and size of a sulcus and ciliary body of the patient's eye with the optical aberrometer. The method can further comprise using a long-wavelength, ocular coherence tomography (OCT) system to perform dark field imaging. The method can further comprise measuring the patient's eye through an iris or sclera of the patient's eye with the OCT imaging system.

In another embodiment a method for correcting a patient's vision with a customized phakic IOL, can comprise performing the following steps:
(a) measuring one or more wavefront aberrations of a patient's eye with an optical aberrometer;
(b) designing a wavefront-customized correction profile for the IOL;
(c) implanting an uncorrected phakic IOL into the patient's eye, and then
(d) determining a final position of the implanted, uncorrected phakic IOL by optically measuring a position of one or more ocular structures or fiducial marks disposed on the IOL; and then
(e) fabricating in-situ a wavefront-customized phakic IOL with the wavefront-customized correction profile, while the IOL is implanted in the eye.

Method step (d) can comprise using one or more of the following optical detectors selected from the group consisting of: a split-prism range finder, an OCT system, a stereo camera setup, and a bi-cell optical detector, or a combination thereof. The method can further comprise:
(f) using a femtosecond laser to create one or more fiducial marks on an uncorrected phakic IOL prior to implanting the IOL, wherein such fiducial marks comprise spots that scatter light coherently or pits that scatter light incoherently; and then
(g) using said fiducial marks for guiding a path of a subsequent laser profiling pulse in step (e).

The method can further comprise using a femtosecond laser to create diffractive structures on the uncorrected IOL; wherein said diffractive structures comprise a plurality of regularly spaced apertures, pits, and/or trenches that scatter light preferentially more strongly at certain incident angles and color combinations. Step (a) can further comprise using a motor to physically switch the optical aberrometer between a telecentric stop optic and a dark field mask optic. Step (a) can further comprise using a telecentric stop with a central obscuration optic that acts as a dark field mask. Step (a) can further comprise using a spatial light modulator disposed along a regular imaging path of the aberrometer. Using the spatial light modulator can comprise using a Wavelength Multiplexed Mask (WMM) optic that: (1) passes a first LED wavelength and blocks a second LED wavelength through a central circular zone of the WMM optic; and simultaneously (2) blocks the first LED wavelength and passes the second LED wavelength through an annular zone of the WMM optic; wherein the first wavelength is different than the second wavelength. Step (a) can further comprise switching on/off a first illumination LED Source out of phase with a second illumination LED source, which allows a regular image to be formed when the first illumination LED is ON and the second illumination LED is OFF; and, conversely, which allows a dark field image to be formed when the first illuminator LED is OFF and the second illuminator LED is ON.

The method can further comprise using a femtosecond laser for creating one or more fiducial marks on a phakic IOL and using said marks for guiding a path of subsequent laser pulses, wherein said fiducial marks comprise spots that scatter light coherently and/or pits that scatter light incoherently. The method can further comprise using a femtosecond laser for creating diffractive fiducial features comprising regularly spaced holes and/or lines that scatter light preferentially more strongly at certain incident angles and color combinations. The method can further comprise using a central aperture in the uncorrected IOL as a fiducial mark. The illumination LEDs can be alternatively switched ON/OFF on alternate frames of the iris imaging camera using software control means. Alternatively, software subtraction of two sequential images, for example, can be used to make a single dark field image. The method can further comprise adjusting an angle of incidence of the optical aberrometer to be different than an optical axis of the patient's eye by up to as much as +/−30 degrees, and further comprising measuring one or more off-axis optical parameters of a patient's eye.

In another embodiment, an uncorrected light-adjustable-lens (LAL) is first implanted and aligned in the patient's eye, followed by adjusting an in-situ shape and a refractive power of the LAL by applying an ultraviolet (UV) light delivery source to create an in-situ customized IOL by photo-polymerization of the IOL. This variation has been described in U.S. Pat. No. 10,166,731 to Grubbs and Sandstedt, which is incorporated herein by reference.

An intraocular lens (IOL), can comprise: two or more adjacent radial (annular) zones, wherein a first IOL shape corresponding to a central core zone (centered on R=0) is optimized for maximizing on-axis refraction whereon at least one second IOL shape corresponding to at least one adjacent annular zone is optimized for an off-axis refraction.

Figure 12:
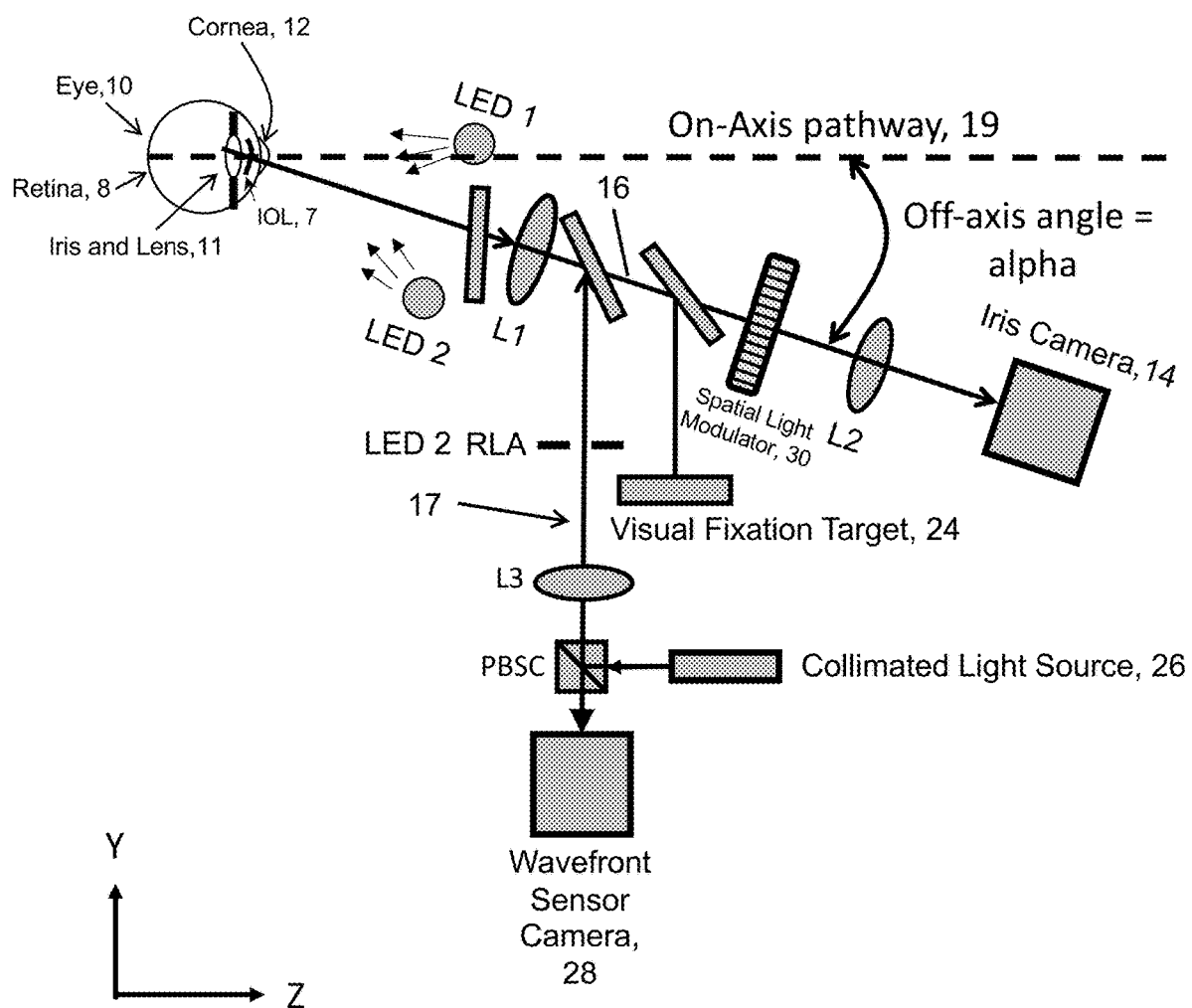
FIG. 12 shows an optical schematic layout of of a first example of an off-axis iris imaging system, combined with an optical aberrometer according to the present invention.

FIG. 12 shows a first alternate embodiment where the angle (alpha) between the iris imaging camera pathway 16 and the optical axis of the patent's eye can be different than a coventional On-Axis angle (where alpha=0 degrees). For example, the angle (alpha) can be continuously adjusted in-between +/−45 degrees. FIG. 12 shows a specific example of an off-axis angle "alpha"=−20 degrees. Adjusting the alpha angle in this way can enhance the system's ability to detect edges and fiducial artifacts, especially when combined with individualized control of illumination sources LED 1 and LED 2. Off-axis refractions of, for example, a patient with macular degeneration, can also be easily performed using this variation in the optical aberrometer design. In this first alternate embodiment, the wavefront sensor pathway 17 is positioned vertically (parallel to the Y-axis in this Figure), so that the complementary angle (not labelled) between the wavefront sensor pathway is equal to 70 degrees. Related to this first alternate embodiment, an innovative IOL can have two or three different radial zones, where a central/core zone (centered on R=0) optimized for on-axis refraction, while a different radial annulus (e.g., 1 or 2 or more different annular zones) that has a visual acuity is optimized for an off-axis refraction.

Figure 13:
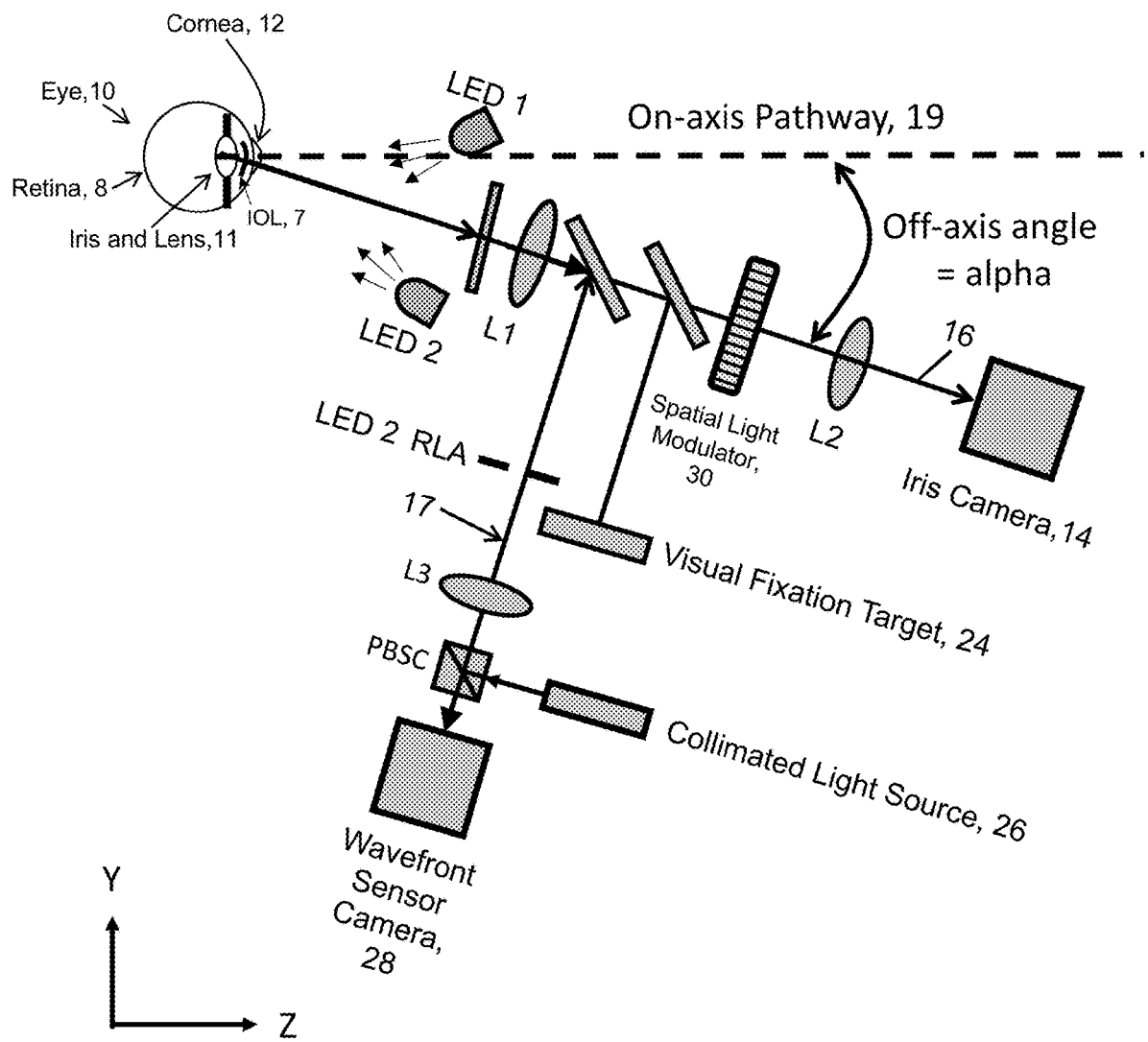
FIG. 13 shows an optical schematic layout of of a second example of an off-axis iris imaging system combined with an optical aberrometer, according to the present invention.

FIG. 13 shows a second alternate embodiment where the angle (alpha) between the iris imaging camera pathway 16 and the optical axis of the patent's eye can be different than a coventional On-Axis angle (=0 degrees). For example, the angle (alpha) can be continuously adjusted in-between +/−45 degrees. FIG. 13 shows a specific example of an off-axis probe beam angle "alpha"=−20 degrees Adjusting the alpha angle in this way can enhance the system's ability to detect edges and fiducial artifacts, especially when combined with individualized control of illumination sources LED 1 and LED 2. Off-axis refractions of, for example, a patient with macular degeneration, can also be easily performed using this variation in the optical aberrometer design. In this second alternate embodiment, the wavefront sensor pathway 17 is positioned at 90 degrees to the iris imaging pathway 16. Related to this second alternate embodiment, an innovative IOL can have two or three different radial zones (i.e, MultiZone IOL), where a central/core zone (centered on R=0) optimized for on-axis refraction, while a different radial annulus (e.g., 1 or 2 or more different annular zones) has a visual acuity that is optimized for each off-axis refraction (which can be measured at a standardized off-axis angle, alpha).

Figure 14:
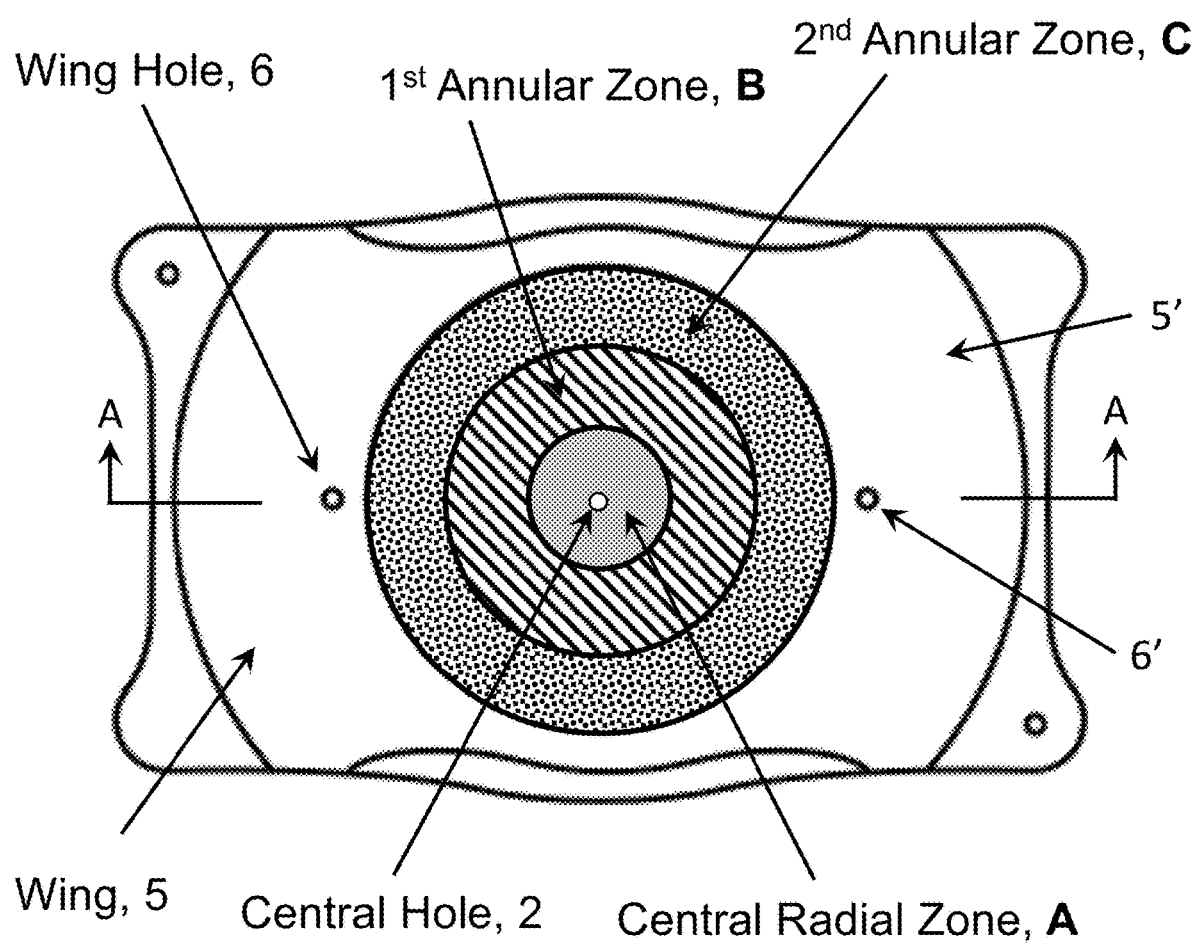
FIG. 14 shows a plan view of a first example of a multi-zone IOL, according to the present invention.

FIG. 14 shows a schematic plan view of a first example of a multi-zone IOL 30 (MZ-IOL), according to the present invention. Here, a Visian ICL, which has a small central hole 2, has a 3-D shape that has been modified according to a Multi-Zone method. In this example, the MZ-IOL 30 comprises three adajacent radial zones: a central radial zone. A; a first (intermediate) annular zone, B; and a second (outermost) Annular Zone, C. These three radial zones (A, B, C) correspond uniquely to three different angles of incidence (alpha) of the aberrometer probe beam 16 relative to the optical axis 19 of the patent's eye (see FIG. 12 for definitions). FIG. 1 shows an example of an first aberrometer setup where the probe beam angle, alpha, =0 degrees, meaning that the probe beam 16 is parallel to, and coincides with, the optical axis 19 of the patient's eye. FIG. 12 shows an example of an second aberrometer setup where the angle, alpha=−20 degrees: meaning that the probe beam 16 is off-axis to (i.e., rotated down or to the side) relative to the optical axis 19 of the patient's eye. This setup in FIG. 12 corresponds, for example, to the 1st (intermediate) annular zone, B. A third setup (such as shown in FIG. 12 or 13) is not shown for brevity, but would be very similar to FIG. 12 or 13, and would have an even larger off-axis refraction angle, for example, alpha=−40 degrees; which corresponds to the $2^{nd}$ (outermost) annual zone, C.

Figure 15:
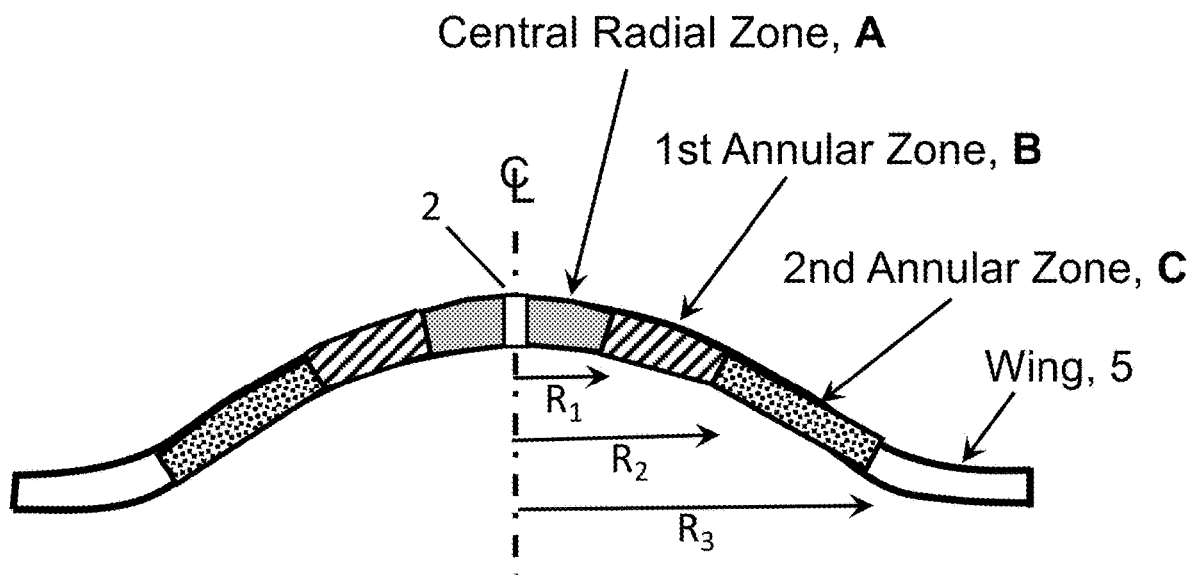
FIG. 15 shows a cross-sectional view of the first example of a multi-zone IOL, according to the present invention.

FIG. 15 shows a schematic cross-section view (SEC A-A) of the first example of a multi-zone IOL (MZ-IOL) initially shown in FIG. 14, according to the present invention. In this example, the MZ-IOL 30 comprises three adajacent radial zones: a central radial zone, A; a first (intermediate) annular zone, B; and a second (outermost) Annular Zone, C. These three radial zones (A, B, C) correspond uniquely to three different angles of incidence (alpha) of the aberrometer probe beam 16 relative to the optical axis 19 of the patent's eye (see FIG. 12 for definitions). FIG. 1 shows an example of an first aberrometer setup where the probe beam angle, alpha, =0 degrees, meaning that the probe beam 16 is parallel to, and coincides with, the optical axis 19 of the patient's eye. FIG. 12 shows an example of an second aberrometer setup where the angle, alpha=−20 degrees, meaning that the probe beam 16 is off-axis to (i.e., rotated down or to the side) relative to the optical axis 19 of the patient's eye. This setup in FIG. 12 corresponds, for example, to the 1st (intermediate) annular zone, B. A third setup (such as shown in FIG. 12 or 13) is not shown for brevity, but would be very similar to FIG. 12 or 13, and would have an even larger off-axis refraction angle, for example, alpha=−40 degrees; which corresponds to the $2^{nd}$ (outermost) annual zone, C. The central radial zone, A, has a radial extent=$R_1$. The $1^{st}$ annular zone, B, has a radial extent from R1 to $R_2$. Finally the 2nd annular zone, C, has a radial extent from $R_2$ to $R_3$. The 3 different Zones represent regions of the MZ-IOL 30 where the shape of each zone has been physically modified to correct for both on-axis (Zone A), and off-axis wavefont aberration measurements (Zones B and C). A person of ordinary skill in the art will recognize that additional zones beyond three could be used, in order to improve the accuracy of the proposed vision improvement method.

The customized IOL can also comprise one or more toric fiducial marks that guide implantation of the IOL relative to a patient's axis of astigmatism.

The optical system, wherein an off-axis angle of incidence (alpha) of an iris Imaging path of the optical aberrometer is adjustable; and can be chosen to be different (or can be the same) as an angle of an optical axis of the patient's eye ranging from 0 degrees up to +/−45 degrees, wherein aberrometer measurements are made that track aberrations of the patient's eye at one or more of these off-axis angles.

The method can further comprise adjusting an angle of incidence of the optical aberrometer to be different than an optical axis of the patient's eye by up to as much as +/−45 degrees, and further comprising measuring one or more off-axis optical parameters of a patient's eye at these off-axis angles.

The method can further comprise implanting and aligning an uncorrected light-adjustable-lens (LAL) in the patient's eye, followed by adjusting an in-situ shape and a refractive power of the LAL by applying an ultraviolet (UV) light delivery source to create an in-situ customized IOL by local photo-polymerization of the IOL.

We claim:

1. A method, comprising:
    (a) implanting an uncorrected Intraocular Lens (IOL) into a patient's eye to make an implanted uncorrected IOL; then
    (b) measuring one or more ocular wavefront aberrations of the patient's eye plus the implanted uncorrected IOL by using an optical aberrometer; then
    (c) designing a wavefront-customized correction profile for the implanted uncorrected IOL by using the one or more ocular wavefront aberrations measured in step (b); and then
    (d) customizing in-vivo the implanted uncorrected IOL to correct the one or more ocular wavefront aberrations of the implanted uncorrected IOL as guided by the wavefront-customized correction profile designed in step (c), while the implanted uncorrected IOL is implanted in the patient's eye; and
    (e) further comprising determining a first size and a first position of the implanted uncorrected IOL by dark field imaging a second position and a second size of a sulcus and a third size ciliary body of the patient's eye with the optical aberrometer.

2. The method of claim 1, further comprising using a long-wavelength, ocular coherence tomography (OCT) imaging system to perform the dark field imaging.

3. The method of claim 2, further comprising measuring the patient's eye through an iris or sclera of the patient's eye with the OCT imaging system.

4. A method, comprising:
(a) using a femtosecond laser to create one or more fiducial marks on an uncorrected Intraocular Lens (IOL) prior to implanting the uncorrected IOL in a patient's eye; then
(b) implanting the uncorrected IOL into the patient's eye, thereby making an implanted uncorrected IOL; then
(c) measuring one or more ocular wavefront aberrations of the patient's eye plus the implanted uncorrected IOL by using an optical aberrometer; then
(d) designing a wavefront-customized correction profile for the implanted uncorrected IOL by using the one or more ocular wavefront aberrations measured in step (c); then
(e) using the one or more fiducial marks from step (a) to guide using the femtosecond laser in subsequent step (f); then
(f) customizing in-vivo the implanted uncorrected IOL by using the femtosecond laser to correct the one or more ocular wavefront aberrations of the implanted uncorrected IOL as guided by the wavefront-customized correction profile designed in step (d), while the implanted uncorrected IOL is implanted in the patient's eye; and
wherein the one or more fiducial marks comprise one or more spots that scatter light coherently and/or one or more pits that scatter light incoherently.

5. A method, comprising:
(a) implanting an uncorrected Intraocular Lens (IOL) into a patient's eye to make an implanted uncorrected IOL; then
(b) creating (in-vivo) one or more fiducial marks on the implanted uncorrected IOL; then
(c) determining a position and/or a rotation of the implanted uncorrected IOL by optically measuring with an optical aberrometer the position and the rotation of the one or more fiducial marks disposed on the implanted uncorrected IOL; then
(d) measuring one or more ocular wavefront aberrations of the patient's eye plus the implanted uncorrected IOL by using the optical aberrometer; then
(e) designing a wavefront-customized correction profile for the implanted uncorrected IOL by using the one or more ocular wavefront aberrations measured in step (d); and then
(f) customizing in-vivo the implanted uncorrected IOL to correct the one or more ocular wavefront aberrations of the implanted uncorrected IOL as guided by the wavefront-customized correction profile designed in step (e), while the implanted uncorrected IOL is implanted in the patient's eye; and
further comprising:
using a femtosecond laser to create one or more diffractive structures on the implanted uncorrected IOL; and
wherein the one or more diffractive structures comprise a plurality of regularly spaced apertures, pits, and/or trenches that scatter light preferentially more strongly at certain incident angles and/or color combinations.

6. The method of claim 5, further comprising
using a femtosecond laser to create one or more diffractive fiducial marks on the implanted uncorrected IOL;
wherein the one or more diffractive fiducial marks comprise one or more regularly spaced holes and/or one or more regularly spaced lines that scatter light preferentially more strongly at certain incident angles and/or color combinations.

7. A method, comprising:
(a) implanting an uncorrected Intraocular Lens (IOL) into a patient's eye to make an implanted uncorrected IOL; then
(b) creating (in-vivo) one or more fiducial marks on the implanted uncorrected IOL; then
(c) determining a position and/or a rotation of the implanted uncorrected IOL by optically measuring with an optical aberrometer the position and the rotation of the one or more fiducial marks disposed on the implanted uncorrected IOL; then
(d) measuring one or more ocular wavefront aberrations of the patient's eye plus the implanted uncorrected IOL by using the optical aberrometer; then
(e) designing a wavefront-customized correction profile for the implanted uncorrected IOL by using the one or more ocular wavefront aberrations measured in step (d); and then
(f) customizing in-vivo the implanted uncorrected IOL to correct the one or more ocular wavefront aberrations of the implanted uncorrected IOL as guided by the wavefront-customized correction profile designed in step (e), while the implanted uncorrected IOL is implanted in the patient's eye; and
further comprising:
(1) using a femtosecond laser to create the one or more fiducial marks on the implanted uncorrected IOL; and
(2) using the one or more fiducial marks to guide a path of subsequent laser pulses in step (f); and
wherein the one or more fiducial marks comprise one or more spots that scatter light coherently and/or one or more pits that scatter light incoherently.

8. A method, comprising:
(a) implanting an uncorrected Intraocular Lens (IOL) into a patient's eye to make an implanted uncorrected IOL; then
(b) creating (in-vivo) one or more fiducial marks on the implanted uncorrected IOL; then
(c) determining a position and/or a rotation of the implanted uncorrected IOL by optically measuring with an optical aberrometer the position and the rotation of the one or more fiducial marks disposed on the implanted uncorrected IOL; then
(d) measuring one or more ocular wavefront aberrations of the patient's eye plus the implanted uncorrected IOL by using the optical aberrometer; then
(e) designing a wavefront-customized correction profile for the implanted uncorrected IOL by using the one or more ocular wavefront aberrations measured in step (d); and then
(f) customizing in-vivo the implanted uncorrected IOL to correct the one or more ocular wavefront aberrations of the implanted uncorrected IOL as guided by the wavefront-customized correction profile designed in step (e), while the implanted uncorrected IOL is implanted in the patient's eye; and
further comprising using a central aperture in the uncorrected IOL as one of the one or more fiducial marks.

9. The method of claim 8, wherein the uncorrected IOL is an uncorrected phakic IOL.

10. The method of claim 8, wherein step (f) further comprises locally changing an index-of-refraction of the implanted uncorrected IOL by using a femtosecond laser to locally modify the index-of-refraction within a localized zone of the implanted uncorrected IOL.

11. A method comprising:
(a) making one or more biometric and one or more sulcus measurements of a patient's eye; then (b) determining a predicted position and a predicted rotation of a phakic Intraocular Lens (IOL); then
(c) measuring one or more wavefront aberrations of the patient's eye with an optical aberrometer, without the phakic IOL being inside of the patient's eye; then
(d) designing a wavefront-customized correction profile for customizing the phakic IOL by using the one or more wavefront aberrations measured in step (c); and then
(e) manufacturing a wavefront-customized phakic IOL by using the wavefront-customized correction profile; and then
(f) surgically implanting the wavefront-customized phakic IOL into the patient's eye, using the predicted position and the predicted rotation previously determined in step (b) for alignment.

12. The method of claim 11, further comprising creating one or more fiducial marks on the phakic IOL to aide in performing step (f).

13. The method of claim 11, wherein step (e) further comprises precision machining the phakic IOL with the wavefront-customized correction profile by using a numerically-controlled lathe with a movable Z-axis stage.

14. The method of claim 11, wherein step (e) further comprises locally changing an index of refraction of the phakic IOL by irradiating selected regions of the phakic IOL with one or more femtosecond laser pulses.

15. The method of claim 11, further comprising dark field imaging, with the optical aberrometer, a position and a rotation of the phakic IOL when implanted in the patient's eye.

16. The method of claim 11, further comprising using an Ocular Coherence Tomography (OCT) imaging system.

17. The method of claim 11, further comprising measuring the patient's eye through an iris or sclera of the patient's eye with an OCT imaging system.

* * * * *